United States Patent [19]
Paulson

[11] Patent Number: 5,629,479
[45] Date of Patent: May 13, 1997

[54] VOLUME DISPLACEMENT MONITORING DEVICE

[75] Inventor: Mark S. Paulson, San Diego, Calif.

[73] Assignee: Solar Turbines Incorporated, San Diego, Calif.

[21] Appl. No.: 566,795

[22] Filed: Dec. 4, 1995

[51] Int. Cl.$^6$ .............................. G01F 17/00; G01B 7/14
[52] U.S. Cl. ................................. 73/149; 33/655; 33/794
[58] Field of Search ..................................... 73/149, 432.1, 73/866.5; 33/613, 645, 655, 703, 792, 794

[56] References Cited

U.S. PATENT DOCUMENTS

| | | | |
|---|---|---|---|
| 1,639,494 | 4/1927 | Flanders | 33/655 |
| 2,599,835 | 6/1952 | Johnson et al. | 33/655 X |
| 3,045,482 | 7/1962 | Domeisen | 73/149 |
| 3,995,374 | 12/1976 | Fisk | 33/802 X |
| 4,146,968 | 4/1979 | Tovey | 33/794 X |
| 4,288,924 | 9/1981 | Mizuno et al. | 33/794 |
| 4,395,827 | 8/1983 | Stowe et al. | 33/655 |
| 4,475,291 | 10/1984 | Aymen | 33/655 X |
| 4,606,129 | 8/1986 | Barrowmen et al. | 33/645 |
| 5,375,341 | 12/1994 | College et al. | 33/783 X |

FOREIGN PATENT DOCUMENTS 3-107701  5/1991  Japan ........................... 33/792

Primary Examiner—Richard Chilcot
Assistant Examiner—Paul D. Amrozowicz
Attorney, Agent, or Firm—Larry G. Cain

[57] ABSTRACT

The present volume monitoring device (40) includes a cylindrical portion (66) having a piston assembly (100) therein. The cylindrical portion (66) having a measuring device (48) attached thereto at one end (46) and a readout gage (44) attached thereto at an other end (50). The measuring device (48) including a plurality of plungers (181) which when the volume displacement monitoring device (40) is positioned within an opening activates a flow of fluid to move the piston assembly (100) and establishes a readout on the readout gage (44). The volume displacement monitoring device (40) provides an economical way of monitoring the size of an opening. Furthermore, the volume displacement monitoring device (40) can be used in the field and does not require additional environmental protection to remain within safety standards.

9 Claims, 6 Drawing Sheets

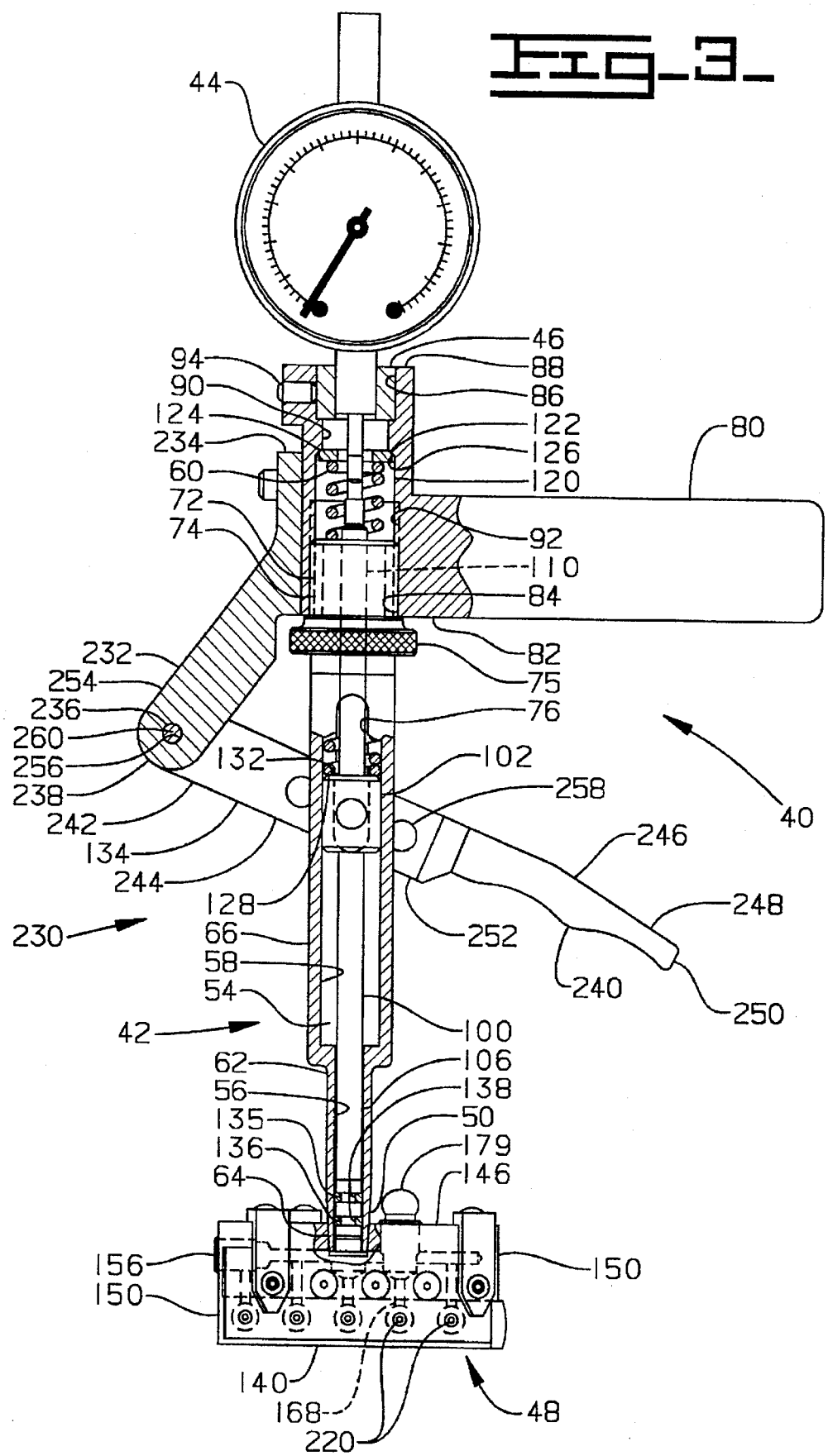
Fig_3

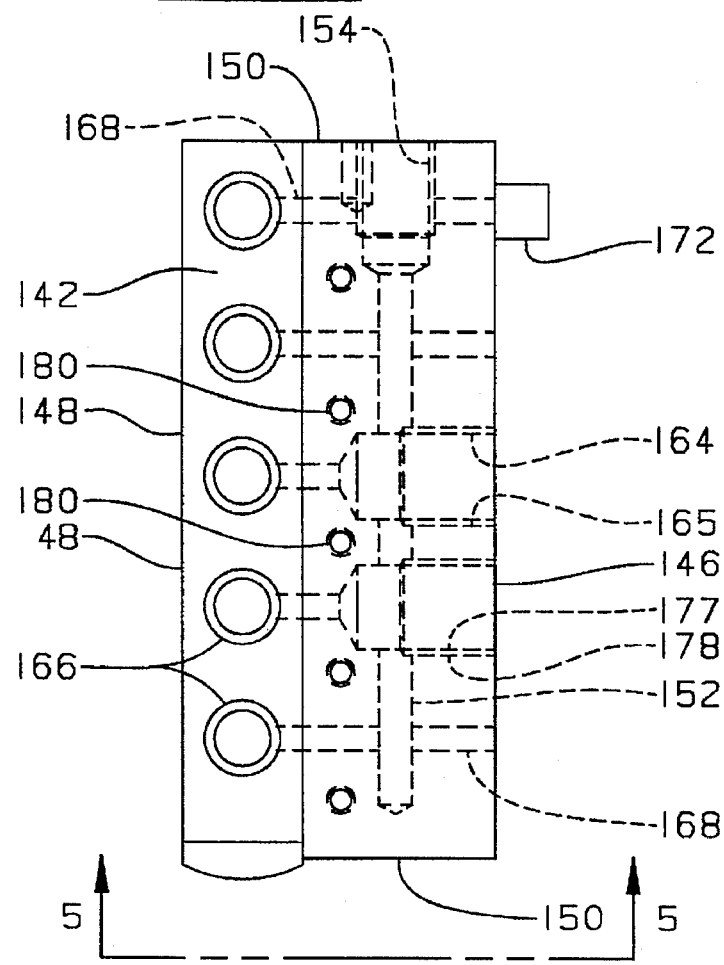
Fig_4_
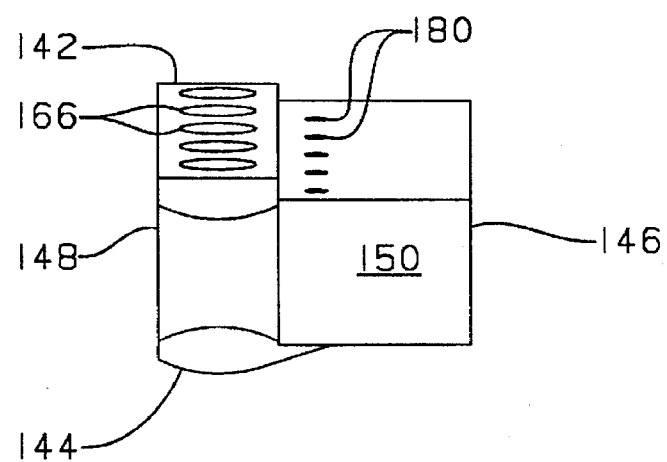
Fig_5_

Fig_6_
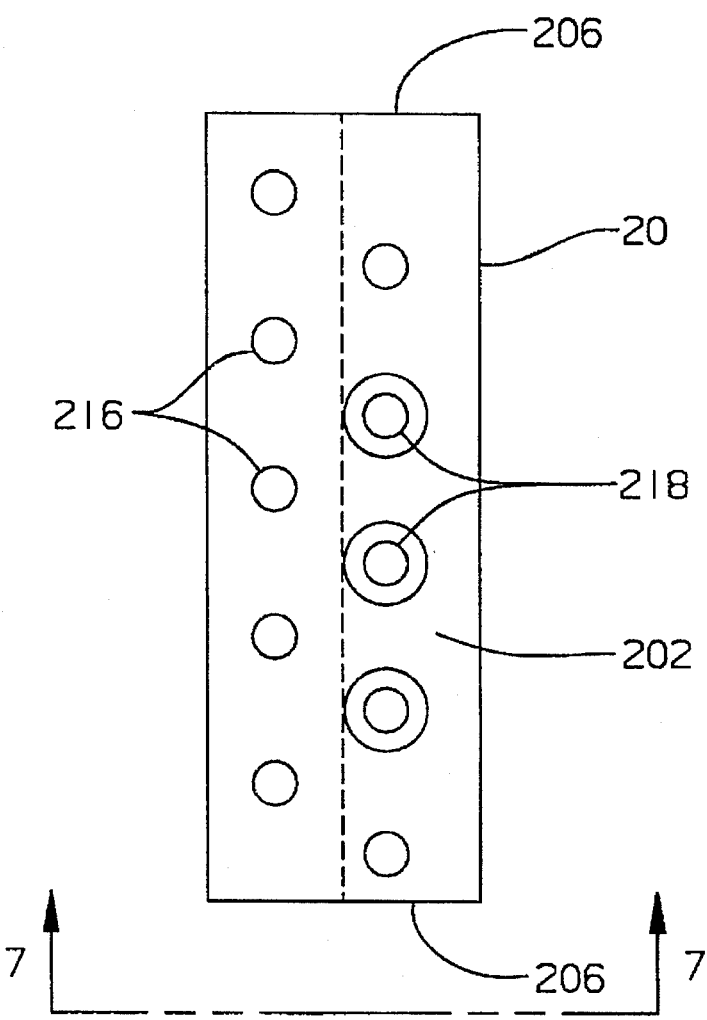
Fig_7_
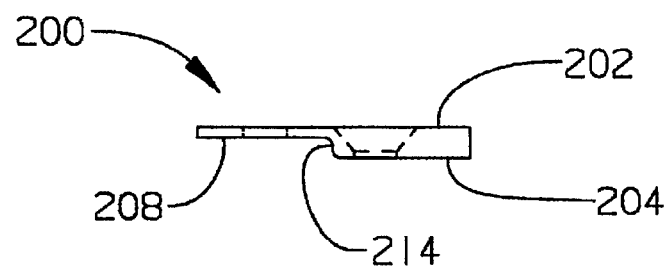

5,629,479

VOLUME DISPLACEMENT MONITORING DEVICE

TECHNICAL FIELD

This invention relates generally to a device for monitoring the physical size of an opening and more particularly to measuring the physical size of a nozzle opening for use with a flow of fluid through the opening.

BACKGROUND ART

In operation of a gas turbine engine, air at atmospheric pressure is initially compressed by a compressor and delivered to a combustion stage. In the combustion stage, heat is added to the air leaving the compressor by adding fuel to the air and burning it. The gas flow resulting from combustion of fuel in the combustion stage then expands through a turbine, delivering up some of its energy to drive the turbine and produce mechanical power.

In order to more efficiently drive the turbine, the gas flow from the combustor is directed against the turbine blades at a given angle and flow rate. Thus, a nozzle having a preestablished size and shape is positioned intermediate the combustor and the turbine. Furthermore, the size and shape of the nozzle will determine the flow characteristics of the gas flow and the resulting efficiency and/or power output.

For example, traditionally the nozzles have either been air or water flow tested to predict the in service performance. However, the hardware is very expensive, a fixture would have to be fabricated for each different nozzle configuration, the system was very large and made field testing impossible and the noise levels could easily exceed safety standards making ear protection and wall insulation mandatory.

Attempts have been make to physically measure the nozzle openings area and then develop a correlation between the area and the service performance. However, such gages are very expensive and require a separate gage for each nozzle configuration making the total cost similar to that of air and water flow testing. Furthermore, these physical measuring gages have wear problems which limits the accuracy to the physical measurement.

The present invention is directed to overcome one or more of the problems as set forth above.

DISCLOSURE OF THE INVENTION

In one aspect of the invention, a volume displacement monitoring device is comprised of a cylindrical portion having a first bore defined therein and having a piston assembly slidably position within the first bore. A readout gage is operative attached to the cylindrical portion and is actuated by the piston assembly. A measuring device includes a block having an axial bore defined therein and is in communication with the first bore in the cylindrical portion. A plurality of displacement bores are within the block, axially spaced therebetween and communicating with the axial bore, and a plunger is being slidably positioned within each of the plurality of displacement bores. The plunger has an end portion extending beyond the block. And, a fluid substantially fills the axial bore, the plurality of displacement bores and the first bore. Movement of the plungers is fluidly communicated to the piston assembly and the movement is recorded on the readout gage.

In another aspect of the invention, a method of assembling a volume displacement monitoring being comprised of a cylindrical portion having a bore therein, a piston assembly, a measuring device including a block having a plurality of bores therein, a plurality of threaded plugs, a bleeder valve and a plurality of plungers is comprised of the following steps. Attaching a sealing device to the piston assembly. Positioning the piston assembly slidablely within the bore of the cylindrical portion. Attaching a sealing member to each of the plurality of plungers. Submersing the cylindrical portion with said piston assembly therein within a fluid. Submersing the block within the fluid and filling the plurality of bores with the fluid. Positioning the plurality of plungers within a portion of the plurality of bores while being submersed in the fluid. Attaching the plurality of plugs within a remaining portion of the plurality of bores while being submersed in the fluid. Attaching the bleeder valve within one of the plurality of bores while being submersed in the fluid. Attaching the cylindrical portion within one of the plurality of bores while being submersed in said fluid. And, opening and then closing the bleeder valve while being submersed in said fluid.

BRIEF DESCRIPTION OF THE DRAWINGS

FIG. 3 is an enlarged partially sectioned view of the volume displacement monitoring device;

FIG. 4 is an enlarged view of a portion of the components making up the volume displacement monitoring device;

FIG. 5 is a end view of a component making up the volume displacement monitoring device, taken along line 5—5 of FIG. 4;

FIG. 6 is an enlarged view of a portion of the components making up the volume displacement monitoring device;

FIG. 7 is an end view of a components making up the volume displacement monitoring devices taken along line 7—7 of FIG. 6.

BEST MODE FOR CARRYING OUT THE INVENTION

Figure 1:
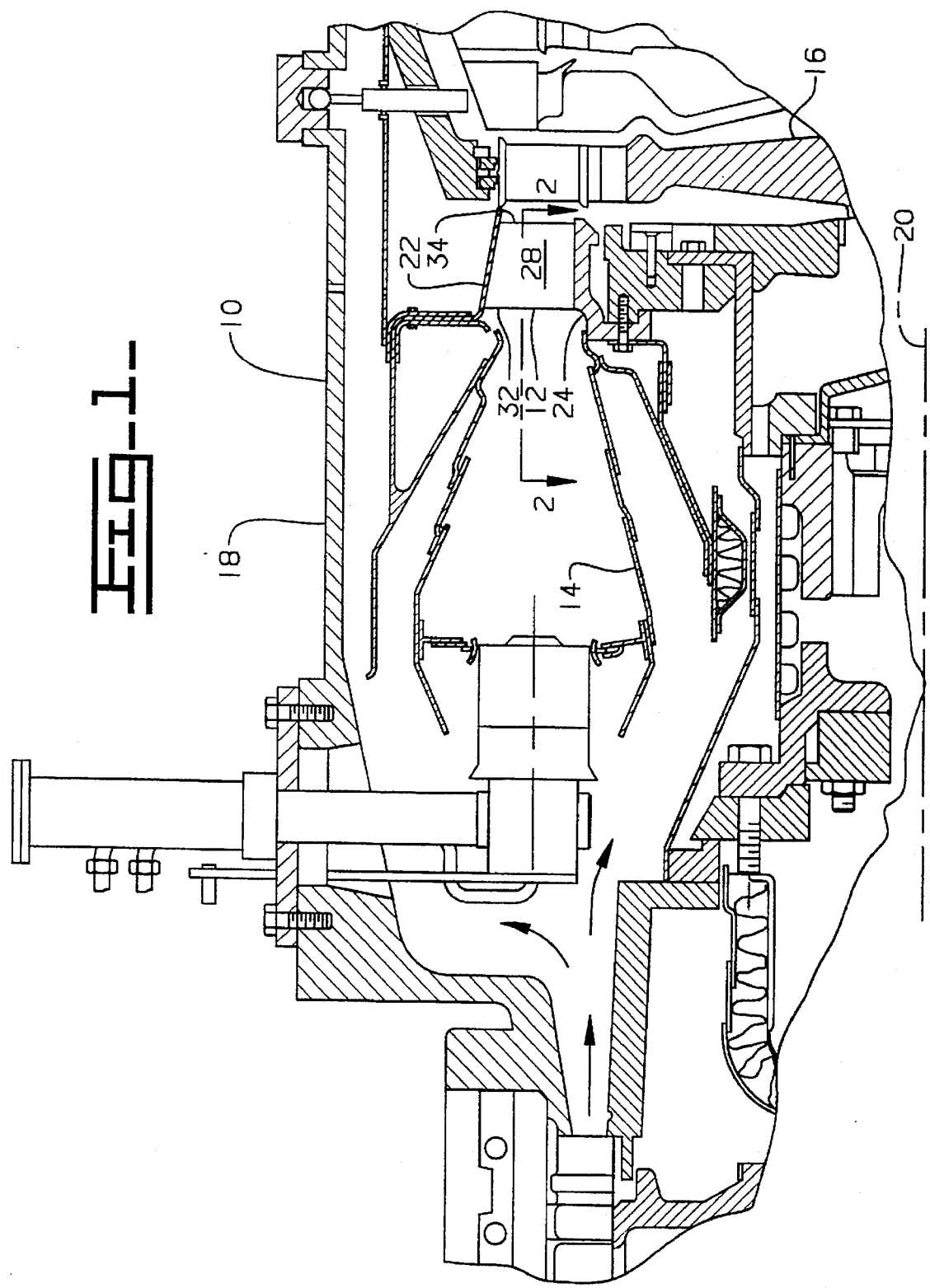
FIG. 1 is a partial sectional view of a gas turbine engine embodying a nozzle to be measured.

Referring to FIG. 1, a gas turbine engine 10 is shown. A nozzle 12 is positioned between a combustor section 14 and a turbine section 16 for use in gas turbine engine. The gas turbine engine 10 has an outer housing 18 having a central axis 20. Positioned in the housing 18 and centered about the axis 20 is the combustor section 14, the turbine section 16 and the nozzle 12.

When the engine 10 is in operation, a flow of combusted gases exit the combustor section 14, pass through the nozzle 12 and is directed to the turbine section 16.

Figure 2:
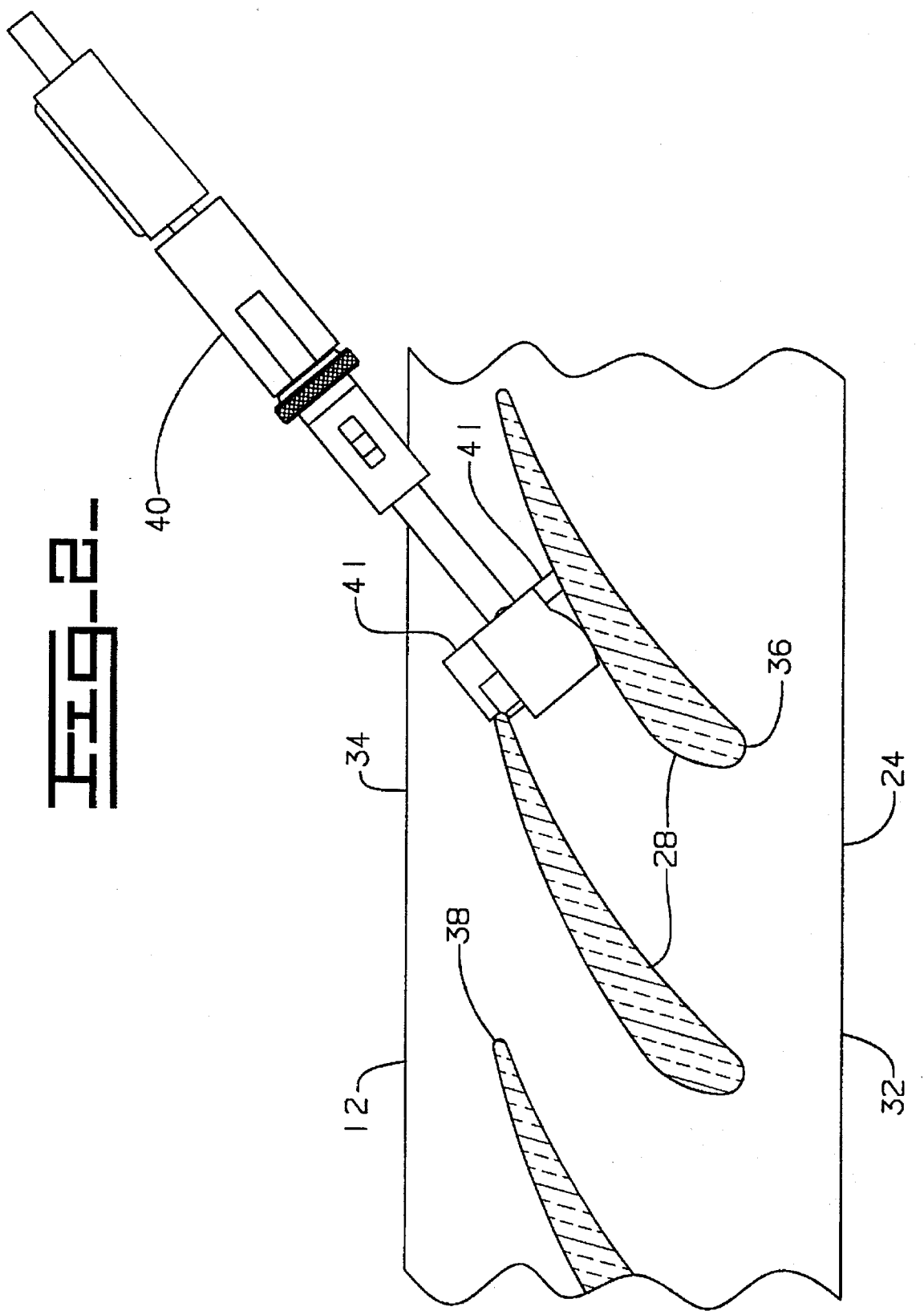
FIG. 2 is a partial sectional view of a nozzle assembly having a plurality of opening in which one of the plurality of openings is being measured by a volume displacement monitoring device.

The nozzle 12, in this application, includes an annular outer shroud 22 and an annular inner shroud 24. Interposed the annular outer shroud 22 and the annular inner shroud 24 is a plurality of stator blades 28. The nozzle 12 further includes a first or inlet face 32 being positioned toward the combustor section 14 and a second or outlet face 34 being spaced from the first face 32 a preestablished axial distance. Each of the plurality of stator blades 28 are in a biased relationship to the first face 32 and the second face 34. As best shown in FIG. 2, a cross-sectional view of each of the plurality of stator blades 28 defines a generally tear drop configuration having a leading edge 36 being positioned near the first face 32 and a trailing edge 38 being positioned near the second face 34. The area between corresponding ones of the plurality of stator blades 28 has a predetermined throat area at the trailing edges 38 and a predetermined throat area at the leading edges 36 which is larger than the predetermined area at the trailing edges 38.

As shown in FIG. 2, a volume displacement monitoring device 40 having a plurality of stop members 41 being preestablishedly positioned thereon is positioned in the preestablished throat area at the trailing edges 38. As further shown in FIG. 3, the device 40 includes a body assembly 42 having a portion thereof being defined by a generally cylindrical stepped configuration and having a readout gage 44 attached at a first end portion 46 and a measuring device 48 attached at a second end portion 50. In this application, the readout gage 44 is a conventional dial indicator. However, as an alternative any number of measuring device being either mechanical or electrical, such as a computer, could be used. The body assembly 42 includes a stepped bore 54 positioned therein. The stepped bore 54 has a first bore 56 defining a predetermined size positioned near the second end portion 50, a second bore 58 being in communication with the first bore 56 and a third bore 60 communicating between the second bore 58 and the readout gage 44. For example in the construction of the body assembly 42, a nipple portion 62 houses the first bore 56 and has a threaded end 64 thereon. A cylindrical portion 66 houses the second bore 58 and is connected to the nipple portion 62. The other end 72 of the cylindrical portion 66 has an external thread 74 thereon having a nut 75 threadedly attached thereto. A pair of slots 76 having a generally elongate configuration are defined in the cylindrical portion 66 and intersect the second bore 58. The remainder of the body assembly 42 is comprised of a handle portion 80 having an end 82 being internally threaded and being threadedly connected to the external thread 74 of the cylindrical portion 66. A first or large bore 84 is positioned at the end 82, a second bore 86 is positioned at an opposite end 88 of the handle portion 80 and a third bore 90 connects the first and second bores 84,86. The handle portion 80 has a threaded bore 92 interconnecting with the third bore 90. And, a portion of the dial indicator 44 is secured within the second bore 86 by a set screw Positioned in the first bore 56 of the nipple portion 62, the second bore 58 of the cylindrical portion 66 and the first bore 84 of the handle portion 80 is a piston assembly 100. The piston assembly 100 includes a main body 102 defining an exterior configuration which is slidably positioned within the second bore 58, a first end portion 106 having a generally cylindrical configuration is slidably positioned within the first bore 56 of the cylindrical portion 66 and a second end portion 110 having an external configuration is slidably positioned in the first bore 84 of the handle portion 80. Positioned about the second end portion 110 of the piston assembly 100 and within the second bore of the cylindrical portion 66 and the first bore 84 of the handle portion 80 is a biasing device 120, which in this application includes a pair of springs. The biasing device 120 has an end 122 abutting one side of a plate 124 positioned within the first bore 84 of the handle portion 80 and which abuts a first shoulder 126 interposed the first bore 84 and the third bore 90 in the handle portion 80, and an other end 128 of the biasing device 120 abuts a shoulder 132 interposed the external configuration of the second end portion 110 and the external configuration of the main body 102. The main body 102 further includes a trigger device 134 attached to the external configuration and extending through the pair of slots 76 and therebeyond. Interposed the first bore 56 of the nipple portion 62 and the first end portion 106 of the piston assembly 100 is a sealing device 135, which in this application, includes a pair of o'rings 136 positioned in a pair of recesses 138 positioned in the first end portion 106.

The measuring device 48, as best shown in FIGS. 3,4 and 5, includes a block 140 defining a first surface 142, a second surface 144 being opposite the first surface 142, a third surface 146 extending between the first and second surfaces 142,144, a fourth surface 148 being opposite the third surface 146 and extending between the first and second surfaces 142,144, and a pair of ends 150. The block 140 in this application, has a generally rectangular shape with a tapered relationship of the surface 142 to the surface 144, but could have a variety of shapes without changing the essence of the invention. For example, the block could be generally rectangular in shape and have a generally arcuate or rounded surface 142. The block 140 has an axial bore 152 therein entering one of the pair of ends 150 and stopping short of the other of the pair of ends 150. The axial bore 152 has an internally threaded end 154 near the pair of ends 150 at which the axial bore 152 enters. A threaded plug 156 is threadedly attached within the internally threaded end 154. The axial bore 152 is in communication with the first bore 56 in the nipple portion 62 by a connecting bore 164 having a threaded end 165. A plurality of displacement bores 166 are in communication with the axial bore 152 by way of an individual bore 168. Each of the individual bores 168 extends through the third surface 146, intersects the axial bore 152 and exits within a corresponding one of the plurality of displacement bores 166. Each of the individual bores 168 has a plug 172, only one shown, positioned therein and welded shut. As an alternative any type of sealing device could be used to plug the end of the individual bores 168 without changing the essence of the invention. The plurality of displacement bores 166 are equally spaced therebetween. Each of the plurality of displacement bores 166 is a blind bore which enters the first surface 142 and stops short of the second surface 144. Each of the plurality of displacement bores 166 has a preestablished diameter which is substantially equal to the other of the plurality of displacement bores 166. An other connecting bore 177 having a threaded end 178 is positioned in the third surface 146 and has a bleeder valve 179 threadedly positioned in the threaded end 178, is shown in FIG. 1. Further positioned in the first surface 142 is a plurality of threaded holes 180. Individual ones of the plurality of threaded holes 180 are generally positioned between respective ones of the plurality of displacement bores 166.

Figure 8:
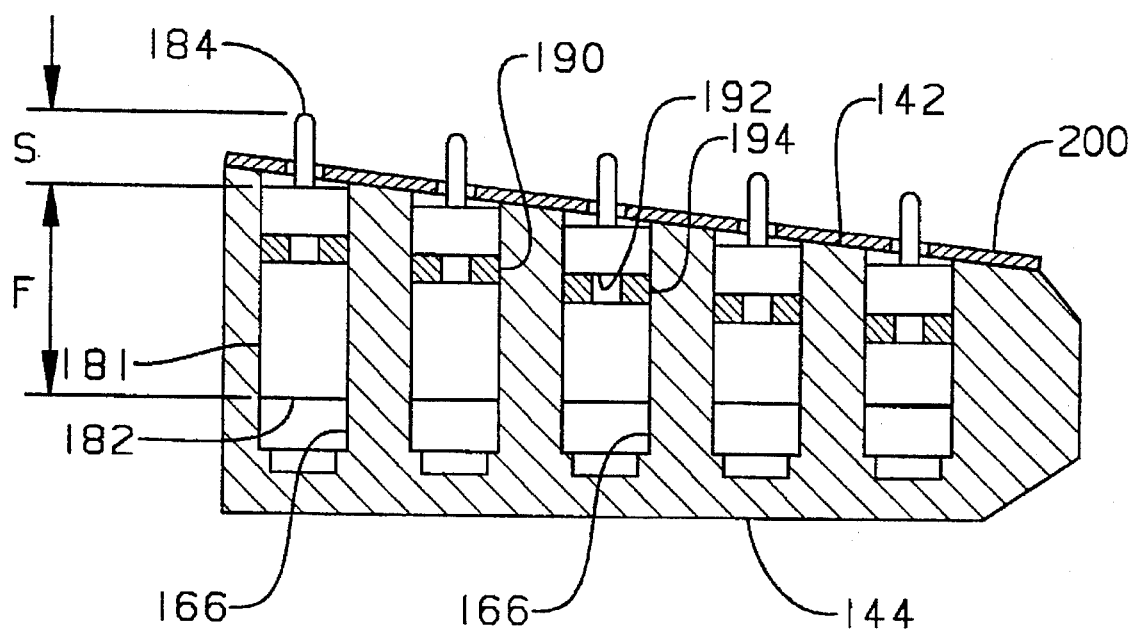
FIG. 8 is an enlarged sectional view of a portion of the volume displacement monitoring device being partially assembled.

As best shown in FIG. 8, each of the plurality of displacement bores 166 has a plunger 181 slidably positioned therein. The plunger 181 includes a first end 182, a second end 184 and has a stepped substantially cylindrical configuration. The plunger 181 has a first axial length, designated as "F", extending from the first end 182 a preestablished distance and a preestablished diameter. A second axial length, designated as "S", extends from the second end 184 to the first axial length "F" and has a diameter being substantially smaller than that of the first axial length "F". Furthermore, the second end 184 has a generally rounded configuration. Positioned on the first axial length "F" of the plunger 181 is a sealing device 190. The sealing device 190, in this application, includes a groove 192 machined in the preestablished diameter of the first axial length "F" of the plunger 181 and has a seal member 194 positioned therein. In this application, the first axial length "F" of each of the plungers 181 has a variable length. However, as an alternative, the length of the first axial length "F" could be constant or equal.

As best shown in FIGS. 6, 7 and 8, the measuring device 48 further includes a cover 200 having a first side 202, a second side 204 being spaced from the first side 202, a pair of ends 206, and a first face 208 being defined between the first and second sides 202,204 and the pair of ends 206. A transition portion 214 connects the first face 208 and the second side 204. A first plurality of holes 216 extend between the first face 208 and the first side 202. The position of the first plurality of holes 216 correspond to that of the plurality of displacement bores 166. A second plurality of holes 218 extend between the first side 202 and the second side 204. The position of the second plurality of holes 218 correspond to that of the plurality of threaded holes 180. A plurality of screws 220 extend through the first plurality of holes and are threadedly assembled within the plurality of threaded holes 180 securing the cover 200 to the block 140, as best shown in FIG. 1.

In this application and best shown in FIG. 3, the volume displacement monitoring device 40 further includes an activation device 230 including a supporting member 232 attached to the handle portion 80 in a conventional manner. The supporting member 232 is attached to the handle portion 80 at a first end 234 and has a bore 236 positioned in a second end 238. Pivotally attached to the second end 238 of the supporting member 232 is a squeezing device 240. The squeezing device 240 defines a first end portion 242 having a generally "U" shaped configuration and includes a pair of leg members 244. Attached to the pair of leg members 244 is a base portion 246 having a gripping member 248 extending therefrom and forming a second end portion 250. The pair of leg members 244 include a first end 252 attached to the base portion 246 and a second end 254. Each of the pair of leg members 244 has a hole 256 positioned near the second end 254 being axially aligned one with the other and a slot 258 positioned intermediate the holes 256 and the first end 252. The slots 258 in each of the pair of leg members 244 is axially aligned one with the other. A fastener assembly 260, such as a pin and clip, is positioned in the holes 256 and the bore 236 of the supporting member 232 completing the pivotal joint.

Prior to being used, the volume displacement monitoring device 40 is assembled in the following manner. For example, the piston assembly 100 has the pair of o'rings 136 assembled in the respective one of the pair of recesses 138. The piston assembly 100 is then positioned within the stepped bore 54 with the first end portion 106 in sliding relationship to the first bore 56. The seal member 194 is assembled within the groove 192 on the first axial length of each of the plungers 181. Thus, seal member 194 and the o'ring seals 136 are subassemblied on the plungers 181 and the piston assembly 100 respectively.

Actual practice has shown that it is best to assemble the measuring device 48 in a fluid submerged atmosphere and is assembled as followed. The various components are submerged within a pan or retainer containing the fluid. The bleeder valve 179 is threadedly connected within the threaded end 178 of the other connecting bore 177. The threaded plug 156 is threadedly attached within the internally threaded end 157. And, the plugs 172 are positioned within the individual bores 168 in sealing relationship, such as by welding or a press fit. Respective ones of the plungers 181, depending on their length, are slidably assembled in the respective one of the plurality of displacement bores 166. The first end 182 of the plunger 181 is positioned in the displacement bore 166 with the second end 184 having the generally rounded configuration protruding beyond the first surface 142 of the block 140. The piston assembly 100 and the cylindrical stepped configuration are threadedly connected within the threaded end 165 of the connecting bore 164. And, the bleeder valve 179 is opened and any air trapped within the measuring device 48 and the first bore 56 is vacated therefrom. Thus, the above method of assembly insures a substantially fluid filled measuring device 48 and first bore After removing the above assembled components from the fluid, the first face 208 of the cover 200 is positioned in contacting relationship to the first surface 142 of the block 140 and corresponding ones of the plurality of holes 218 are positioned about the second axial length "S". Individual ones of the plurality of screws 220 are threadedly engaged with the corresponding ones of the plurality of threaded holes 180 and extend through the respective ones of the second plurality of hoses 218 in the cover 200 securing the cover 200 to the block 140.

Next, the activation device 230 is slipped over the cylindrical portion 66 of the body assembly 42 and the trigger device 134 is positioned within the slots 258 in each of the pair of leg members 244. The trigger device 134 is attached to the piston assembly 100 and projects through the pair of slots 76 into the slots 258. The biasing device 120 is slid over the second end portion 110 of the piston assembly 100 so that an end 128 abuts the shoulder 132. The plate 124 is positioned within the first bore 84 of the handle portion 80 and abuts the first shoulder 126 of the handle portion 80. The external thread 74 of the cylindrical portion 66 of the body assembly 42 has the nut 75 positioned thereon and is threadedly attached to the threaded bore 92 of the handle portion 80. The nut 75 is tightened against the end 82 of the handle portion 80 and positions the handle portion 80 relative to the pair of slots 76 and the trigger device 134. The biasing device 120 has the end 122 in contacting relationship with the plate 124 and positions the plate 124 in contacting relationship with the first shoulder 126 of the handle portion 80. The other end 128 of the biasing device 120 is in contacting relationship with the shoulder 132 on the piston assembly 100 and presses the trigger device 134 against the pair of slots 76 in the cylindrical portion 66 and the slots 258 in the pair of leg member 244 of the activation device 230. Furthermore, the supporting member 232, which is attached to the handle portion 80, has the fastener assembly 260 assembled in the bore 236 of the supporting member 232 and the holes 256 in the pair of leg members 244 providing pivotal relationship.

Attached at the end 88 of the handle portion 460 within the third bore 90 is the dial indicator 44. The dial indicator 44 is secured within the second bore 86 by the set screw 94 and is in abutment with the piston assembly 100. Thus, the body assembly 42 is completed.

The volume displacement monitoring device 40 provides an economical way of monitoring the size of an opening. Furthermore, the volume displacement monitoring device 40 can be used in the field and does not require additional environmental protection to remain within safety standards. An added feature of the volume displacement monitoring device 40 allows the device to be calibrated and any wear to be compensated for during the calibration process. The volume displacement monitoring device 40 is placed in a set-master.

Industrial Applicability

In use, prior to being used for inspection or checking, the volume displacement monitoring device 40 is calibrated.

After calibration, the volume displacement monitoring device 40 is positioned within the throat area at the trailing edge 38 of one of the openings and the results of the opening size is compared to that of the predetermined size by viewing the reading or recorded position of the dial indicator. If for example, the reading indicates that the opening is too small the size of the opening can be increased and the measuring technique repeated until the correct size is obtained. If, for example, the reading indicates that the opening is too large the size of the opening can be decreased and the measuring technique repeated until the correct size is obtained. After establishing the correct size of the opening the technique is repeated on each of the openings until a correct size is obtained within each of the openings.

Any size or shape of opening can be adapted to be measured by a volume displacement monitoring device 40 designed specifically for the opening.

In actual operation, the actuation device 230 is compressed causing the trigger device 134 to axially move the piston assembly 100 against the biasing device 120 and the players 180 are retracted within the block 140. The measuring device 48 is positioned within the opening and the plurality of stop members 41 locate the measuring device 48 to a repeatable preestablished location within the opening. After being properly positioned within the preestablished throat area the actuation device 230 is released and the biasing device 120 axially moves the piston assembly 100 displacing a portion of the fluid from the first bore 56 causing the rounded second end 184 of the plungers 181 to come into contact with the adjacent one of the plurality of stator blades 28. Thus, the variation of the axial movement of the piston assembly 100 will register a variation in the dial indicator 44 of either a plus or minus from the calibrated dial indicator. If the indication is plus, the opening is too large and if the indication is minus the opening is too small. By using several plungers 181 axially spaced along the throat area a mean or average measurement can be obtained. Thus, insuring an accurate and effective volume displacement monitoring device 40.

The volume displacement monitoring device 40 provides an economical way of monitoring the size of an opening. Furthermore, the volume displacement monitoring device 40 can be used in the field and does not require additional environmental protection to remain within safety standards. An added feature of the volume displacement monitoring device 40 allows the device to be calibrated and any wear to be compensated for during the calibration process.

Other aspects, objects and advantages of this invention can be obtained from a study of the drawings, the disclosure and the appended claims.

I claim:
1. A volume displacement monitoring device comprising:
   a cylindrical portion having a first bore defined therein and having a piston assembly slidably position within the first bore;
   a readout gage operatively attached to the cylindrical portion and being actuated by the piston assembly;
   a measuring device including a block having an axial bore defined therein and being in communication with the first bore in the cylindrical portion, a plurality of displacement bores being axially spaced therebetween and communicating with the axial bore, and a plunger being slidably positioned within each of the plurality of displacement bores, each of said plungers having an end portion extending beyond the block; and
   a fluid substantially filling said axial bore, said plurality of displacement bores and said first bore, and movement of said plungers being fluidly communicated to said piston assembly and said movement being recorded on said readout gage.

2. The volume displacement monitoring device of claim 1, wherein said measuring device further includes a cover having a plurality of holes therein being positioned about corresponding ones of the plungers positioned in the plurality of displacement bores, and said end portion of the plungers extending beyond the cover.

3. The volume displacement monitoring device of claim 1, wherein each of said plungers has a sealing device positioned thereon being in sealing relationship with the respective plurality of displacement bores.

4. The volume displacement monitoring device of claim 1, further including a biasing device positioned within the cylindrical portion and having an end abutting the piston assembly.

5. The volume displacement monitoring device of claim 1, further including a trigger device being attached to the piston assembly and having a portion thereof extending through the cylindrical portion.

6. The volume displacement monitoring device of claim 1, further including a handle portion interposed the cylindrical portion and the readout gage.

7. The volume displacement monitoring device of claim 1, wherein said plurality of displacement bores are axially spaced therebetween an equal distance.

8. The volume displacement monitoring device of claim 1 wherein said plungers have a variable length.

9. Volume displacement monitoring device of claim 1, wherein said piston assembly includes a main body having a sealing device thereon.

* * * * *